Nov. 13, 1962 W. P. WARTHEN 3,063,094
METHOD AND APPARATUS FOR PRODUCING FILAMENTS
OF HEAT-SOFTENABLE MATERIALS
Filed July 29, 1959 2 Sheets-Sheet 1
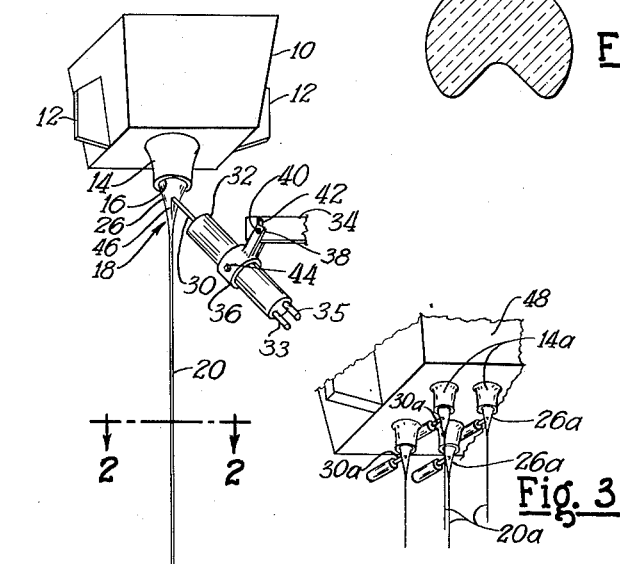
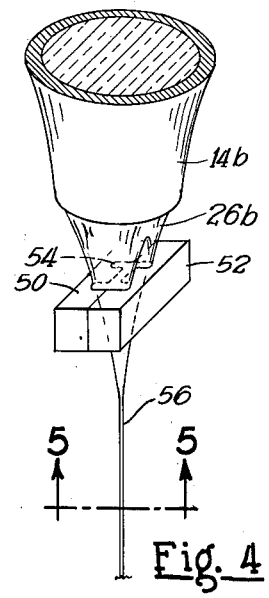
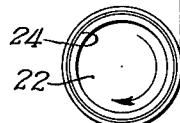
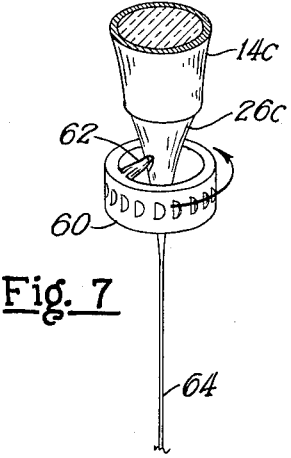
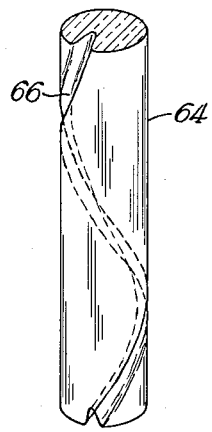
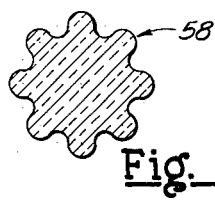
INVENTOR.
WILLIAM P. WARTHEN
BY
ATTORNEYS

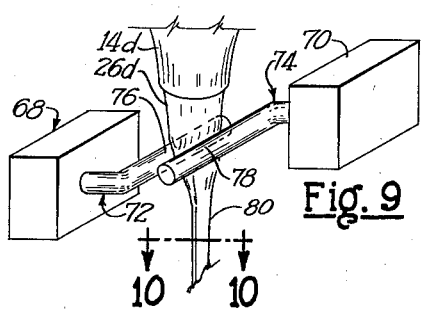
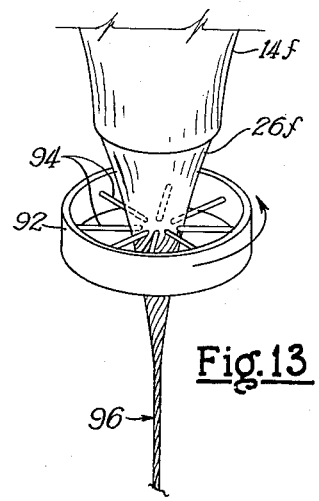
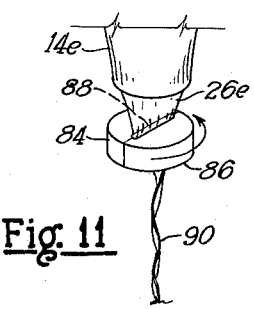
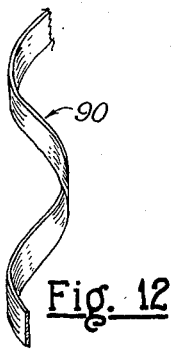
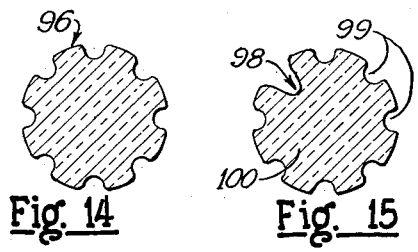
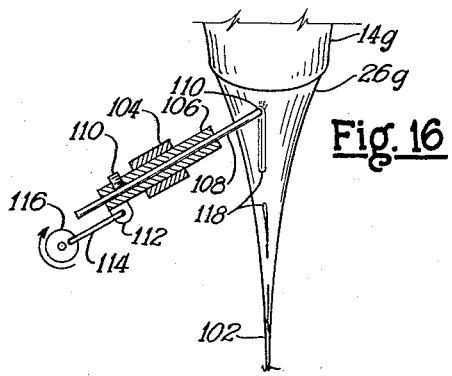
INVENTOR.
WILLIAM P. WARTHEN

United States Patent Office 3,063,094
Patented Nov. 13, 1962

3,063,094
METHOD AND APPARATUS FOR PRODUCING FILAMENTS OF HEAT-SOFTENABLE MATERIALS
William P. Warthen, Newark, Ohio, assignor to Owens-Corning Fiberglas Corporation, a corporation of Delaware
Filed July 29, 1959, Ser. No. 830,418
15 Claims. (Cl. 18—8)

This invention relates to method and apparatus for producing continuous filaments of heat-softenable material and more especially to a method and apparatus for processing streams of heat-softenable filament-forming material such as glass wherein viscosity control of the streams enables the production of more uniform filaments from highly liquidous glasses or the production of filaments of noncircular cross-section or noncylindrical shape by conditioning the streams to a viscous state or condition such that configurations or shapes impressed in a viscous region of the streams persist in the filaments attenuated from the streams.

It is well known that textile fibers or continuous filaments drawn or attenuated from heat-softened glass or other heat-softened materials are normally of substantially circular cross-section and have comparatively smooth surfaces. In order to secure efficient attenuation of streams of glass to fine textile filaments, the glass streams must be in a viscous condition in order to be drawn into fine filaments. If the glass streams are of high viscosity i.e. a highly liquid condition it becomes difficult to attenuate them to filaments.

It is highly desirable that the heat-softened glass in the feeder or supply be maintained at a high temperature and low viscosity in order to flow uniform streams from the feeder but such streams are too liquidous for successful attenuation. Cooling fins disposed adjacent but out of contact with the streams of glass have been employed to increase the viscosity of the streams preparatory to attenuation but changing atmospheric or ambient conditions affect the constancy of heat dissipation necessitating critical control of the environment.

Filaments attenuated from glass streams are normally of circular cross-section due to high surface tension of the softened glass and attempts to form fine filaments of non-circular shape or having roughened surfaces particularly suitable for textiles have not been commercially successful.

It is well known that natural textile fibers such as cotton or wool fibers have roughened surfaces and are of non-circular cross-section and that such characteristics enhance the processing of such fibers into yarns providing a natural interfelting of the fibers or filaments.

Apparently due to the comparatively large smooth surface area, fine textile filaments formed of glass have a tendency to abrade one another during processing into yarns and threads and such abrasion contributes to a reduction in the strength properties of the yarns. Furthermore, filaments or fibers formed of glass having smooth surfaces are not conducive to the formation of yarns having good interlocking or felting characteristics desirable in textile fabrication.

This invention embraces a method and apparatus for forming filaments or fibers from heat-softenable, fiber-forming materials by attenuation wherein the streams of softened material delivered from a feeder are conditioned to a desired viscosity by contact with a surface or are modified in shape, indented or distorted at a viscous region of the streams whereby the modified cross-sectional shapes of the streams are retained and perpetuated in the solidified filaments or fibers attenuated from the streams.

An object of the invention is the provision of a method of controlling or regulating the viscosity of a stream of glass or other heat-softened fiber-forming material flowing from a feeder by establishing contact of the stream with a surface or heat sink to modify the viscosity of the material of the stream to a condition suitable for efficient attenuation to fibers and enabling the maintenance of the material in the feeder at a low viscosity or liquidous state whereby to obtain more uniform streams flowing from the feeder.

Another object is the provision of a method and arrangement for controlling and stabilizing a stream of heat-softened mineral material such as glass by modifying the viscosity of the material through contact of a heat sink with the stream at its region of delivery from a feeder containing the heat-softened flowable material whereby more efficient attenuation of the stream to filament or fiber form may be attained.

An object of the invention is the provision of a method of producing filaments from heat-softenable mineral material such as glass wherein the filaments may be formed of noncircular cross-section or noncylindrical whereby the filaments so produced may be fashioned into textiles and the filaments more readily interlocked or felted together in the yarns or threads having high strength characteristics and requiring a lower concentration of sizing on the filaments of the yarn.

Another object of the invention is the provision of a method and apparatus for modifying the cross-sectional configuration of filaments formed from glass or other heat-softenable, fiber-forming material providing simulated roughened surfaces on the filaments having improved resistance to abrasion whereby textile yarns or threads fashioned of such filaments or fibers are endowed with interfelting properties similar to cotton or wool yarns.

Another object of the invention is the provision of an apparatus or arrangement adapted for indenting, impressing or cutting a groove or recess or plurality of recesses in a stream of heat-softened material at a region of comparatively high viscosity and attenuating the stream to a fiber or filament in a manner perpetuating the general configuration of the highly viscous region in the attenuated finished filament or fiber.

Another object of the invention embraces a method and apparatus for distorting heat-softened material of a stream of fiber-forming material at a region wherein the viscosity of the stream is sufficiently high as to become rapidly chilled or solidified during attenuation of the streams to a continuous filament whereby a similar distortion in the cross-sectional configuration is retained in the attenuated solidified filament.

Another obejct of the invention is the provision of a heat sink arranged for engagement with the cone-shaped region of a stream of heat-softened glass, the position of the heat sink being adjustable to control and stabilize the viscosity of the material at the cone region.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a schematic view of a stream feeder and filament attenuating means illustrating a method of engaging the stream with a heat sink or surface for stabilizing or modifying the viscosity of the glass or controlling the character and cross-sectional configuration of the attenuated filament;

FIGURE 2 is a greatly enlarged sectional view of one form of filament attenuated through the use of the method illustrated in FIGURE 1, the view being taken substantially on the line 2—2 of FIGURE 1;

FIGURE 3 is a schematic view of a feeder illustrating the method for flowing a plurality of streams which are engaged by surfaces or heat sinks for controlling the character or shape of the attenuated filaments;

FIGURE 4 is a fragmentary isometric view of another form of apparatus for configurating a stream of heat-softened material to a noncircular configuration;

FIGURE 5 is a greatly enlarged sectional view of a filament formed through the use of the method and arrangement shown in FIGURE 4, the view being taken on the line 5—5 of FIGURE 4;

FIGURE 6 is a sectional view of a filament or fiber of multi-grooved configuration which may be formed through the use of the method of the invention;

FIGURE 7 is an isometric view illustrating another form of apparatus for forming a spirally grooved filament;

FIGURE 8 is an isometric view illustrating a length of filament formed by the apparatus and method illustrated in FIGURE 7;

FIGURE 9 is an isometric view illustrating another form of apparatus for carrying out the method of the invention;

FIGURE 10 is an enlarged sectional view of the filament formed by the apparatus shown in FIGURE 9, the view being taken on the line 10—10 of FIGURE 9;

FIGURE 11 illustrates another form of apparatus for carrying out the method of the invention utilized in forming a curly or spirally shaped filament of noncircular cross-section;

FIGURE 12 is an enlarged view showing a length of filament formed by the method shown in FIGURE 11;

FIGURE 13 is an isometric view of an apparatus for carrying out the method of the invention in forming a filament having a spirally grooved or roughened surface configuration;

FIGURE 14 is an enlarged sectional view illustrating the configuration of filament formed by the method and apparatus shown in FIGURE 13;

FIGURE 15 is a view similar to FIGURE 14 showing a section of filament formed with nonsymmetrical grooves or flutes formed through the use of the method, and FIGURE 16 is a schematic view illustrating another form of apparatus for forming a filament provided with spaced indentations.

While the method and apparatus of the invention are particularly adapted for producing continuous fibers or filaments of circular cross-section or filaments of indented, grooved or noncircular cross-section from heat-softenable material having thermo-critical viscosity characteristics such as glass, it is to be understood that the method and the apparatus of invention may be employed for controlling or stabilizing the viscosity of streams of glass or other materials for any purpose or for modifying the cross-sectional configurations of the streams.

The invention has particular utility in forming comparatively fine attenuated filaments from streams of heat-softened glass and the method of the invention may be employed to modify or stabilize the viscosity of the material of the streams or for distorting, indenting or shaping a region of the cone-shaped zone of the stream of glass of a viscosity characteristic which enables the retention and perpetuation of an indentation, distortion or configuration in the filament or fiber attenuated from the softened glass by reason of rapid increase in viscosity and solidification of the material.

Referring to the drawings in detail and initially to the arrangement shown in FIGURES 1 and 2, there is illustrated schematically a feeder 10 adapted to contain a supply of heat-softened glass or other heat-softened filament-forming material.

The feeder 10 may be associated with the forehearth (not shown) of a glass melting furnace providing a supply of molten or heat-softened glass, or the feeder 10 may be of the type adapted to reduce prerefined glass cullet in the form of marbles or pieces which may be reduced to flowable state in the feeder by the application of electric energy.

The feeder 10 is provided with connectors or terminals 12 which are adapted to be engaged by current conductors or bus bar for flowing electric current through the feeder for melting the marbles or pieces of glass in the feeder, or if the feeder is connected with a forehearth, for maintaining the glass in the feeder at a viscosity suitable for flowing streams from the feeder. The feeder is formed with one or more tips or projections 14 depending therefrom and each projection formed with an orifice 16 through which flows a stream 18 of glass or other heat-softened material from the feeder.

The stream of glass is attenuated to a continuous filament or fiber 20 by suitable means. As shown in FIGURE 1, a mandrel 22 supports a collector sleeve 24, the mandrel being rotatable to collect the filament 20 in a wound package formation on the collector 24. The collector 24 is rotated at a comparatively high speed whereby the attenuated filament 20 is very fine, the linear rate of attenuation being upwards of 15,000 or more feet per minute.

The heat generated in the feeder 10 by a passage of electrical current therethrough may be controlled or regulated to obtain and maintain the desired temperature of glass in the feeder to condition the glass at low viscosity or highly fluid state to facilitate flowing streams of uniform character.

Due to the surface tension of the softened glass, the stream, at the region immediately beneath the orificed projection 14, is of cone-shaped as shown at 26. As the stream is drawn downwardly and attenuated to a filament, the viscosity of the glass rises comparatively rapidly in the ambient temperature and hence rapidly sets up or solidifies in a filament or fiber formation.

Under normal conditions the glass stream is of substantially circular cross-section throughout regions of the cone 26 and the attenuated filament is likewise of circular cross-section. When the method of the invention is utilized to conduct heat away from the stream, the surface or member 30 engaging the cone shaped region 26 is employed as a "heat sink" to raise the viscosity of the highly liquidous glass to obtain improved attenuation of the stream to a continuous filament of circular cross-section through better stabilization of the cone of the stream. A suitable medium may be employed for continuously conducting away heat from the stream transmitted to the member 30 by contact with the stream.

The method of the invention is usable for forming indented, distorted or noncylindrical filaments or fibers from streams of glass of increased viscosity by reason of the critical viscosity characteristics of the stream in the cone formation thereof adjacent the feeder in impressing, indenting or distorting the glass of the cone by engagement of the cone with the surface, member or bar 30. The composition of the glass or other heat-softenable, filament-forming material having thermo-critical viscosity characteristics influences the position of the probe bar or means 30 when the same is employed for distorting or indenting the stream.

It is therefore desirable to mount the "heat sink," indenting or stream distorting means 30 whereby the region and extent of engagement of the means with the stream may be adjusted and controlled. As illustrated in FIGURE 1, a relatively stationary support or bracket 34 provides mounting means for the member 32 carrying the means 30. Surrounding the member 32 is a sleeve 36 having an ear portion 38 provided with an opening to accommodate a securing means or bolt 40. The support 34 is provided with a vertically elongated slot 42 cooperating with the bolt 40 and providing means for vertically adjusting the sleeve 36, the mounting member 32 and the stream-indenting probe bar or member 30.

When the arrangement is employed as a "heat sink," the support 32 is provided with inlet and outlet tubes or tubular means 33 and 35 to accomodate a circulating heat-absorbing medium such as water to continuously convey heat away from the cone region 26 of the glass stream.

The mounting member 32 is slidably disposed in the sleeve member 36 to provide for relative movement or adjustment of the probe 30 toward or away from the axis of the cone 26 of the glass stream. The member 32 may be locked in adjusted position in the sleeve 36 by means of a locking member or screw 44.

Through the medium of a suitable adjustable mounting means, the extent of penetration of the surface or means 30 into the cone 26 and its engagement with the region of viscosity of the cone most suitable for forming filaments of circular cross-section or for forming a groove in or distortion of the stream may be obtained.

FIGURE 2 illustrates a cross-section of attenuated filament 20 permanently formed with a longitudinal indentation or groove 46, a result attained by engagement of the means of probe 30 with a region of the cone of sufficiently high viscosity to prevent or deter the glass from reversion to a stream of normal circular cross-section. Due to continuous high speed attenuation and progressive "necking in" of the distorted region of the cone during filament formation, the indentation or recess formed by the probe in the cone of viscous glass is perpetuated as a continuous indentation of groove in the attenuated filament. By reason of the rapid solidification of the viscous glass and the increase in the surface tension of the glass as it cools, the groove or recess is permanently formed in the attenuated filament.

FIGURE 3 is illustrative of a feeder construction having a plurality of orificed projections flowing a like number of streams to form filaments by attenuation. In this arrangement, the feeder 48 is provided with a plurality of projections 14a each of which delivers a stream of glass having a cone formation 26a at the tip of each projection.

Members, probes or "heat sink" means 30a are provided for increasing the viscosity of the glass or for indenting or modifying the shape of the cones 26a to form grooved filaments. The probes 30a may be mounted by adjustable means such as that illustrated in FIGURE 1 to adjust or control the relative positions of the probes or member 30a with respect to the adjacent cones 26a of glass streams and members 32a provided with means to accommodate circulating heat absorbing medium.

The filaments 20a formed from the streams may be gathered together to form a linear group or strand and the same wound upon a rotating collector in the manner illustrated in FIGURE 1. The feeder 48 may be provided with any desired number of orifices for flowing glass streams dependent upon the number of filaments desired in forming a multi-filament strand or sliver. Strands or slivers so formed may be twisted or further processed to form yarns or threads.

FIGURE 4 illustrates an apparatus for carrying out the method of forming a filament or fiber of a modified cross-sectional configuration. FIGURE 4 illustrates, on an enlarged scale, a projection or tip 14b associated with a feeder (not shown) from which flows a stream of glass having a cone formation 26b adjacent the tip of the projection 14b. In the arrangement illustrated in FIGURE 4, the cone of glass is reshaped or distored by means of mating or matching dies or matrices 50 and 52.

Each of the dies is fashioned with a recess configurated so that the recesses together form an H-like shape as indicated at 54, a cross-section view of the filament or elongated body 56 attenuated from the stream being illustrated in FIGURE 5.

In carrying out the method utilizing the apparatus shown in FIGURE 4, the dies 50 and 52 are disposed with respect to the cone 26a of the stream at a region where the material or glass is highly viscous or plastic in character but sufficiently soft to be drawn through and shaped by the configuration 54 provided by the dies 50 and 52 and retain the shape under the influence of the surface tension of the glass and its rapidly increasing viscosity due to rapid chilling by the ambient atmosphere so that the cross-sectional configuration persists in the attenuated filament as shown in FIGURE 5.

If an increased rate of chilling or solidification is desired, the dies 50 and 52 may be provided with chambers to facilitate the circulation of heat-absorbing or temperature-controlling fluid such as water providing a "heat-sink" to control the rate of increase in viscosity of the material as it moves through the dies 50 and 52. The dies 50 and 52 may be mounted for vertical adjustment relative to the cone 26a in order to engage the dies with the stream at the region of proper viscosity of the glass to effect the formation and retention of the H-shaped configuration in the solidified attenuated filament formed from the stream.

FIGURE 6 is illustrative of the cross-sectional shape of a filament 58 which may be formed a like configuration embodied in dies similar to those shown in 50 and 52 in FIGURE 4. In such method, each die is configurated with a portion of the cross-sectional configuration illustrated in FIGURE 6 so as to form a filament having a plurality of longitudinal grooves in its surface area as shown in FIGURE 6.

FIGURE 7 is illustrative of a form of apparatus for carrying out the method of indenting or distorting a stream of glass or other heat-softened material from which a filament may be attenuated with a spiral groove fashioned therein generally lengthwise the filament as shown in the section of filament illustrated in FIGURE 8. FIGURE 7 illustrates on an enlarged scale an orificed projection or tip 14c from which flows a glass stream having the cone formation 26c. Surrounding the cone 26c of the stream is an annular member 60 which is adapted to be rotated at a comparatively high rate of speed.

The annular member 60 is formed with a probe bar or projection 62 which extends inwardly of the annulus preferably toward the axis of the cone 26c with the end region of the probe engaging and extending into the material of the cone. The filament 64, attenuated from the cone 26c of the stream by winding the same on a collector in the manner illustrated in FIGURE 1 or by other suitable attenuating means, is thus formed with a peripheral groove or indentation 66.

Concomitantly with the rotation of the annulus 60 and the circumferential formation of a spiral groove of low pitch or angularity in the cone 26c by the rotating probe 62, the glass of the stream is being attenuated or moved downwardly at a comparatively high linear speed whereby the angle of the spiral indentation 66 is relatively acute in the attenuated filament and is permanently formed in the filament by reason of rapid chilling and solidification of the rapidly moving filament.

Thus the rotating probe 62 engages a region of the cone 26c of glass which is sufficiently viscous to foster the persistence or perpetuation of the groove in the cone yet is plastic to an extent that the glass may be drawn to a progressively decreased cross-sectional area, the high rate of attenuation influencing the inclination of the spiral groove, resulting in a relatively steep angularity of the groove or indentation 66 in the end product or filament 64.

The angularity of the groove or recess in the attenuated filament 64 may be varied by modifying the relative rate of rotation of the probe 62, the rectilinear rate of attenuation of the filament or both. Hence if a filament is desired having a spiral groove or indentation of low pitch, the speed of attenuation may be reduced or the speed of rotation of the probe increased to attain such result. It is to be understood that several grooves or recesses may be formed in a filament by employing a plurality of probes 62 in the rotatable annulus 60.

FIGURE 9 illustrates a modified form of apparatus for carrying out the method of the invention particularly adaptable for forming a generally flat or noncircular fiber, filament or elongated body of glass or other material having similar viscosity characteristics. The apparatus includes means or members 68 and 70 which form supports for die members 72 and 74. In the embodiment illustrated, the die members are in the form of rods having spaced portions 76 and 78 arranged in generally parallel relation. The rod portions 76 and 78 are spaced to engage and accommodate the cone 26d of the glass stream flowing from the orificed projection 14d.

The die members or rod portions 76 and 78 confine the viscous glass in directions to mold or shape the glass to a substantially rectangular or an elliptical cross-section. The fiber or filament 80 formed from the glass of the stream by attenuation is of comparative fineness in comparison with the cross-sectional area established in the cone of the stream by the die rods 76 and 78, an enlarged cross-sectional view of the flat filament being shown in FIGURE 10.

The attenuation of the fiber or filament 80 at a high linear speed and rapid chilling of the reshaped glass setting up a high viscosity of the glass being drawn away from the rods or members 76 and 78 results in a perpetuation of the generally rectangular cross-section in the attenuated fiber or filament. The rods may be made tubular or fashioned with passages to accommodate a circulating heat-absorbing fluid when employed as a "heat sink." The supporting members 68 and 70 for the rods may be adjustably supported for transverse movement for regulating the transverse spacing between the rods and for vertical adjustment so as to position the rods for engagement with the cone of glass at a region wherein the viscosity is sufficiently high to avoid reversion of the glass below the rods to normal circular cross-section where flat filaments are to be formed.

While the rod portions 76 and 78 engaging and reshaping the cone of glass are illustrated as arranged in parallel relation, it is to be understood that the rods may be shaped or curved to indent or shape the glass to other cross-sectional configurations having concave or convex curvatures for imparting particular shapes to the attenuated filament or fiber 80. Thus a filament having a generally elliptical cross-section or of hourglass shape formed by opposed concave surface areas may be produced. The surfaces of the rods may be serrated to impart a grooved surface configuration to the attenuated filament.

FIGURE 11 is illustrative of a form of apparatus for carrying out the method in the production of a spiral or curly continuous fiber or filament. In this form of apparatus, a stream-shaping means comprising semicircular elements 84 and 86 are mated to form a circular disk-like unit which is rotatable relative to the glass stream. The diametrical regions of the components 84 and 86 are recessed to provide an elongated slot, opening or matrix 88 through which the glass stream is directed from an orifice tip 14e.

The cone 26e of the glass stream adjacent the tip 14e has its normal circular configuration distorted or modified to the cross-sectional configuration of the slot 88, the stream being attenuated by a linear movement of the filament 90 at a high rate of speed by means such as a rotating collector of the character shown in FIGURE 1 or other suitable attenuating instrumentality. Concomitantly with the rectilinear attenuation of the filament 90, the means 84, 86 is rotated, imparting a spiral shape to the highly viscous glass as it moves through the rotating slot 88.

The rate of rotation of the members 84, 86 in relation to the rate of linear attenuation of the filament 90 determines the angularity or pitch of the spiral of the filament 90c an enlarged section of the spiral or curly filament 90 being illustrated in FIGURE 12. If a spiral of steep angularity is desired the components 84, 86 are rotated at a lesser speed as compared with the linear rate of attenuation of the filament and, if a spiral of lesser angularity or decreased pitch is desired, the components 84, 86 are rotated at a higher rate of speed as compared with the linear movement of the filament.

It is to be understood that the linear attenuating rate of the filament 90 must be correlated with the flow of glass from the orifice to prevent a piling up of the glass of the cone 26e on the upper surface area of the rotating components 84, 86 as an accumulation of glass in this region would impair attenuation of the filament 90. The slot 88 may be defined by surfaces of different shape to impart a correspondingly shaped cross-section to the filament. The rotating components 84 and 86 are disposed relative to the cone of glass to engage the glass at a region wherein the viscosity is sufficiently high to avoid reversion of the reshaped glass during attenuation to circular cross-section.

FIGURE 13 is illustrative of an apparatus for imparting spiral grooves or roughness to the surface region of a filament. In this form of apparatus, a rotatable annular member 92 surrounds the cone 26f of glass flowing from an orificed tip 14f. Extending inwardly from the annulus 92 and preferably radially arranged are projections or probes 94 which may be in the form of cutters, the extremities of which indent or extend into the cone 26f of glass.

By rotating the annulus 92, the probes or projections 94 sever cuttings from or indent the cone of glass forming peripheral kerfs or grooves in the glass during attenuation of the filament 96 from the cone of the stream. As the filament is attenuated at high linear speed, the kerfs or grooves are perpetuated in the attenuated filament and as the glass is drawn to a fine filament, the grooves are at comparatively steep spiral angles as shown in FIGURE 13. The higher the rotation of the annulus 92 compared to the linear attenuating rate of the filament, the less steep the angle of the spiral configurations in the filament surface.

The radially arranged probes or cutters 94 may be disposed in the same plane or in vertically spaced planes without modifying the method of the invention. By modifying the relative vertical positions of the extremities of the probes or cutters the lengthwise spacing of the spiral grooves may be controlled. The annulus 92 and the cutter bars or probes 94 may be water cooled if desired. If indentations in the filament are desired without cutting the glass at the cone, the probe bars 94 may be fashioned with rounded or blunt extremities so that they merely impress spiral indentations in the glass of the stream.

The position of the annulus 92 may be adjusted so that the probes or bars 94 engage a region of proper viscosity in the glass in the cone to effect a severing of the glass or an indenting of grooves in the surface region of the filament 96. FIGURE 14 is an enlarged sectional view through the filament 96 illustrating the spiral grooves or kerfs formed in the filament.

FIGURE 15 is a sectional view similar to FIGURE 14 wherein one of the grooves designated 98 is of a greater depth than other grooves 99 in a filament 100. The arrangement shown in FIGURE 15 may be fashioned through the use of the apparatus shown in FIGURE 13 wherein one or more of the probes or cutters extend into the cone of glass at a greater depth than the others. Thus a filament having nonsymmetrical grooves or kerfs may be made by the method through the use of apparatus of the character shown in FIGURE 13.

FIGURE 16 illustrates another form of apparatus for carrying out the method of the invention in forming or fashioning a continuous filament or elongated body of glass with longitudinally extending, lengthwise spaced indentations or recesses in a filament to provide a roughened surface. The cone of glass 26g flows from an orificed tip or projection 14g and the glass of the cone attenuated to a filament 102 as by winding the filament upon the collector in the manner shown in FIGURE 1.

Disposed adjacent the cone of glass 26g is a support 104 having a bore within which is slidably disposed a member or plunger 106. The member 106 is tubular and accommodates a probe or glass engaging member 108, the extremity 110 of which is adapted for intermittent engagement with and projection into the glass of the cone 26g. The rod or probe 108 is adjustably supported within the tubular member 106 and may be located in adjusted position by means of a locking screw 110.

Means is provided for reciprocating or causing intermittent engagement of the probe 108 with the glass of the cone. In the embodiment illustrated, the reciprocable plunger 106 is formed with an extension 112 connected by means of a link or connecting rod 114 with a rotating disk 116, the link being connected with the disk at a region removed from its axis providing a crank for reciprocating the plunger 106 and the probe or glass engaging member 108. The disk 106 may be rotated by a suitable motor or other means (not shown).

In this arrangement, rotation of the crank disk 116 causes reciprocation of the probe 108 and intermittently project the extremeity 110 of the probe 108 into the glass of the cone 26g, this action occurring during attenuation of the glass into a filament 102. Through the reciprocation of the probe 108 a series of short length recesses or grooves 118 extending longitudinally of the axis of the cone and spaced lengthwise in the cone form intermittent recesses in the filament 102 providing an indented or roughened surface in the filament.

The depth of the recesses may be regulated by adjusting the extent of penetration of the probe bar 108 into the glass, and the length of each of the recesses 118 may be controlled by the relative rate of rotation of the disk 116 and hence, the rate of reciprocation of the rod 108. The probe 108 is disposed to engage the glass of the cone at a region at which the viscosity is sufficiently high to avoid obliteration of the recesses by reversion of the soft glass to a circular cross-section.

The recesses 118, are of comparatively short length at the region of engagement of the probe 108 with the glass, and the action of attenuation in drawing the glass into a fine continuous filament effects an elongation of the recesses and a reduction in their width so that in the attenuated filament the grooves or recesses appear as fine lines in the surface region of the filament. It is to be understood that several probes 108 may be arranged circumferentially of the axis of the glass stream for engagement and penetration of the glass of the cone to impart a series of circumferentially spaced, minute longitudinal recesses in the filament.

In the method of the invention and the utilization of the apparatus for forming fibers or filaments of noncircular cross-section, it is essential to the satisfactory production of the various shapes and configurations of filament, that the indentation, penetration or cutting of the glass be carried on at a region of the stream where the viscosity is such that the glass or other material is in a highly viscous, plastic or moldable condition whereby movement of the deformed or indented region of the cone persists in the attenuated filament and that solidification of the material occurs before the distorted or disturbed glass reverts to its normal condition of circular cross-section. It is to be understood that while in several forms of structural arrangement disclosed, the disclosures involve the method of processing a single filament, the forms of the apparatus may be utilized with individual streams of a number of streams flowing from the same feeder as exemplified in FIGURE 3 of the drawings.

The stream engaging means, when employed as a "heat sink" through the use of a circulating cooling or heat-absorbing fluid, is quite effective and efficient in controlling or regulating the viscosity of the glass streams at the cone regions thereof by reason of direct contact of the means with the streams whereby heat is withdrawn from the glass by conduction independently of the ambient temperature or environment.

The method of the invention may be utilized to apply a metallic coating in the indentations or grooves formed in the noncircular filaments. In such use of the method, the members or stream-engaging means are formed of metal or alloy which is fusible at a temperature below the temperature of the glass at the cone regions so that the extremities of the stream engaging members are softened or rendered molten thereby to coat the surfaces of the recesses, indentations or grooves with a thin film of metal or alloy. The fusible stream-engaging bodies of metal or alloy are continuously advanced into the soft glass at a rate dependent upon the rate of fusion of the metal or alloy or the thickness of the film or layer of metal or alloy desired to be applied to the filaments.

It is apparent that, within the scope of the invention, modifications and different arrangements may be made other than as herein disclosed, and the present disclosure is illustrative merely, the invention comprehending all variations thereof.

I claim:

1. The method of processing heat-softened mineral material including flowing a stream of the material from an orifice at a viscosity providing a cone-shaped region, modifying the configuration of the cone at a zone of increasing viscosity, attenuating the material of the modified cone into a solidified linear body under conditions perpetuating the general cross-sectional configuration of the modified cone in the linear body.

2. The method of forming a filament of noncircular cross-section from heat-softened glass including flowing a stream of glass from an orifice at a viscosity providing a cone-shaped region of the stream at its zone of delivery from the orifice, indenting the cone of glass at a region of comparatively high viscosity to render the stream noncircular in cross-section, and attenuating a filament from the stream at a linear rate to effect solidification of the filament and promote retention of a noncircular cross-section in the attenuated filament.

3. The method of forming a filament of noncircular cross-section from heat-softened glass including flowing a stream of glass from an orifice at a viscosity providing a cone-shaped region of the stream at its zone of delivery from the orifice, engaging the cone of glass with a probe at a region of comparatively high viscosity forming a recess in the cone, and attenuating a filament from the stream at a linear rate to effect solidification of the filament and promote retention of the recess in the attenuated filament.

4. The method of forming a filament from heat-softened glass including flowing a stream of glass from a supply, engaging the stream with a surface of a solid body at a region of the stream of comparatively high viscosity and modifying the cross-sectional configuration of the stream by the surface, and attenuating the stream to filament form at a linear rate effective to solidify the modified cross-sectional configuration in the filament.

5. The method of forming a filament from heat-softened mineral material including flowing a stream of the material from an orifice, engaging the stream with a surface at a region of the stream of comparatively high viscosity, moving the surface relative to the axis of the stream to form a recess in the material of the stream, attenuating the stream to a fine filament, and perpetuating the recess in the filament by attenuation at a linear rate avoiding reformation of the material to the cross-sectional shape of the stream at its region of delivery from the orifice.

6. The method of forming a plurality of continuous filaments of noncircular cross-section from heat-softened fiber-forming material including flowing a plurality of streams of the material of circular cross section from a supply, engaging and indenting the streams at regions of comparatively high viscosity by solid surfaces to modify the cross-sectional shape of the streams, and attenuating the streams to filaments at a rate to effect retention of the modified shape in the attenuated filaments.

7. Apparatus for processing heat-softened mineral material, in combination, a feeder adapted to contain a supply of heat-softened mineral material, said feeder provided with an orifice through which a stream of the material of circular cross section is discharged, a heat sink member arranged to engage and dissipate heat from the stream at a region of high viscosity of the material to modify the cross-sectional configuration of the stream, and means for attenuating the modified stream to a solidified body at a linear speed sufficient to retain the modified configuration in the attenuated body.

8. Apparatus for processing heat-softened mineral material, a feeder adapted to contain a supply of heat-softened mineral material, said feeder provided with an orifice through which a stream of the material of substantially circular cross section is discharged, a support, a heat sink member arranged to engage and dissipate heat from the stream at a region of high viscosity of the material to modify the cross-sectional configuration of the stream, means for adjusting the relative position of said heat sink member, and means for attenuating the modified stream to a solidified filament at a linear speed sufficient to retain the modified configuration in the filament.

9. Apparatus for processing heat-softened mineral material, in combination, a feeder adapted to contain a supply of heat-softened mineral material, said feeder provided with an orifice through which a stream of the material of substantially circular cross section is discharged, a heat sink member disposed to extend into and dissipate heat from the material of the stream at a region of high viscosity of the material, said member being rotatable about the axis of the stream, and means for attenuating the stream of material to a filament in the direction of its length concomitantly with rotation of said member for forming a peripheral recess in the attenuated filament.

10. Apparatus for processing heat-softened mineral material, in combination, a feeder adapted to contain a supply of heat-softened mineral material, said feeder provided with an orifice through which a stream of the material is discharged, a heat sink probe engaging and indenting the stream at a region of progressively increasing viscosity of the material, adjustable mounting means for said heat sink probe for controlling the region of engagement of the indenting means with the stream and the depth of the indentation, and means for attenuating the stream to a filament at a linear speed effective to perpetuate the indentation in the attenuated filament.

11. Apparatus for processing heat-softened mineral material, in combination, a feeder adapted to contain a supply of heat-softened mineral material, said feeder provided with an orifice through which a stream of the material is discharged, a support, and a heat sink probe mounted by the support engaging and indenting the softened material of the stream at a region adjacent to and spaced from the orifice.

12. The method of processing heat-softened mineral material including flowing a stream of the material from an orifice, engaging and indenting the material of the stream adjacent the orifice with a heat-conducting bar, and continuously circulating a fluid medium in heat transferring relation with the bar and out of contact with the stream for continuously conveying away heat from the bar derived from the material for controlling the viscosity of the material of the stream.

13. The method of processing heat-softened mineral material including flowing a stream of the material from an orifice at a viscosity providing a cone-shaped region adjacent the orifice, indenting the cone at a zone of increasing viscosity, attenuating the material of the indented cone into a solidified linear body and perpetuating the general cross-sectional configuration of the indented cone in the linear body.

14. The method of processing heat-softened mineral material including flowing a stream of the material of circular cross section from an orifice, modifying the viscosity of a portion of the material of the stream by engaging and reshaping the cross section of the material in the stream with a heat sink surface of a solid body contoured for the desired reshaping of the material of the stream at a region adjacent to and spaced from the orifice, and attenuating the material with the reshaped cross section into a solidified linear body under conditions perpetuating the reshaped cross sectional configuration in the linear body.

15. The method of processing heat-softened mineral material including flowing a stream of the material of substantially circular cross section from an orifice, engaging and reshaping the cross sectional configuration of the material of the stream adjacent the orifice with a heat conducting solid surface, continuously conveying heat away from the surface to control the viscosity of the reshaped cross sectional configuration of the material of the stream, and attenuating the material of the modified cross sectional configuration into a solidified linear body under conditions perpetuating the reshaped cross sectional configuration in the linear body.

References Cited in the file of this patent

UNITED STATES PATENTS

| | | |
|---|---|---|
| 1,750,971 | Soubier | Mar. 18, 1930 |
| 2,291,289 | Slayter et al. | July 28, 1942 |
| 2,489,508 | Stalego | Nov. 29, 1949 |
| 2,515,738 | Slayter et al. | July 18, 1950 |
| 2,578,986 | Schoonenberg | Dec. 18, 1951 |
| 2,708,813 | Borgeaux | May 24, 1955 |
| 2,765,586 | Wilson | Oct. 9, 1956 |
| 2,783,590 | Stalego | Mar. 5, 1957 |
| 2,880,551 | Martuscello | Apr. 7, 1959 |

FOREIGN PATENTS

| | | |
|---|---|---|
| 511,857 | Great Britain | Aug. 25, 1939 |